Jan. 1, 1963   J. M. HEINIG   3,070,823
FOUNTAIN-TYPE POWER LAWN MOWER SCRAPER
Filed Feb. 9, 1960
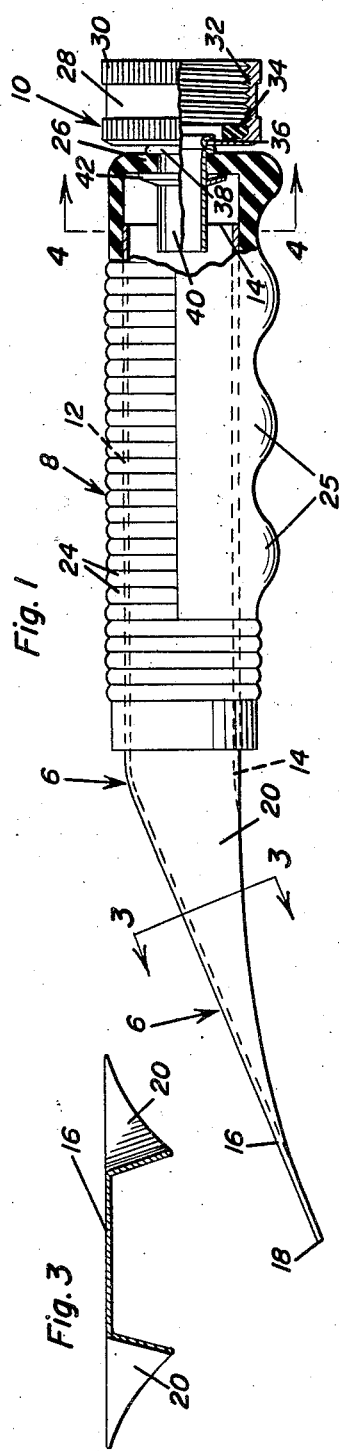
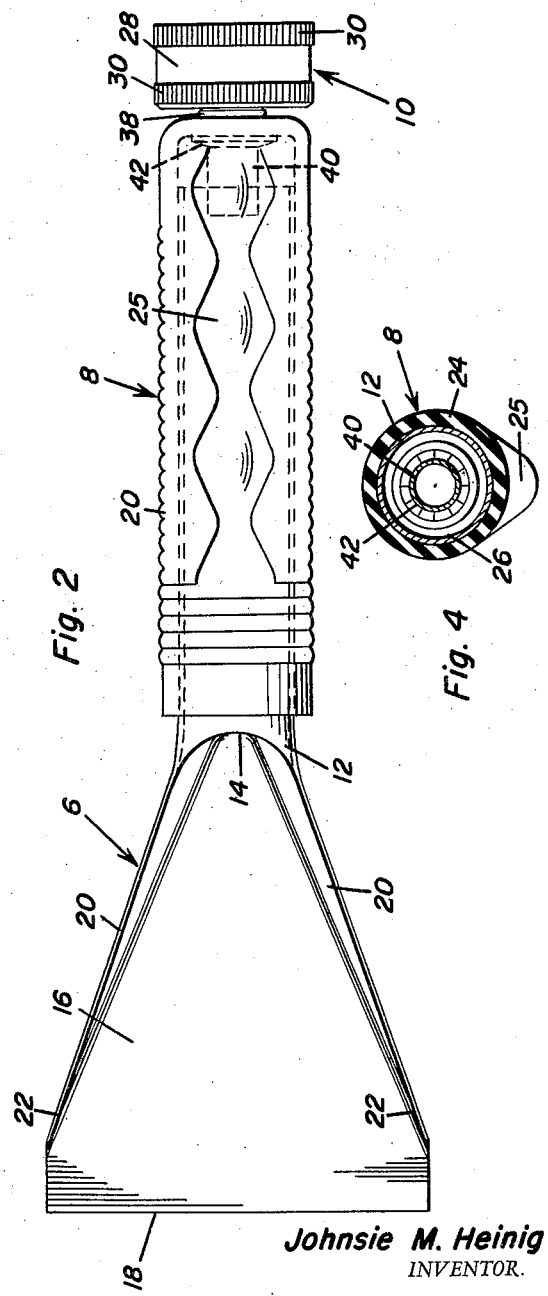
Johnsie M. Heinig
INVENTOR.

3,070,823
FOUNTAIN-TYPE POWER LAWN MOWER SCRAPER
Johnsie M. Heinig, 5283 Oak Tree Drive, Flint 4, Mich.
Filed Feb. 9, 1960, Ser. No. 7,603
1 Claim. (Cl. 15—507)

The present invention relates to certain new and useful improvements in a simple mechanical manually usable scraping, clearing and fluishing implement which is expressly, but not necessarily, designed and adapted for use when cleaning the interior skirt portion of the hood on a rotary power mower, for example, the type used for lawn cutting needs.

To be sure, hand tools and makeshift-type implements are usually available and on hand when one, having mowed the lawn, takes the time to clean the interior of the blade housing before storing it until next used. Manifestly, if the mass of grass cuttings adheres to the housing surfaces, the skirt portion for example, is dislodged and disposed of while fresh, so to speak, no particular difficulty is encountered. When, however, this mass of material hardens and is converted into a crust-like deposit, it is difficult to cope with and requires considerable time in freeing and dislodging it.

There has long existed a recognized need for a practical scraping, clearing and cleaning device to cope with the problem above reflected upon. It follows that it is an object in the instant matter to satisfactorily solve the problem. As a matter of fact, it is believed that the desired result has been attained. To this end, a fountain-type scraper is provided, that is, an implement which is characterized by a suitable scraper blade, handle means therefor, and wherein the handle means is provided with a coupling which enables one to attach an ordinary garden hose thereto, turning the water on so that it may be caused to flush slowly over the surfaces being scraped and cleaned.

Broadly, the invention has to do with an improved combination of practical and efficient expedients cooperating with each other in a novel manner and unitedly producing not only a novel and efficient instrumentality but a new and improved result.

In carrying a preferred embodiment of the invention a sheet metal, plastic or equivalent scraper blade unit is provided. This has a tubular shank which telescopes into the bore of a readily applicable friction-retained rubber or equivalent hand-grip. The hand-grip, in turn, is provided at the water intake end of the shank with a hose coupling.

More specifically, the concept comprehends a rigid open-ended tube of prerequisite length in cross-section having intake and discharge ends, the discharge end being provided with an oblique angled flat-surfaced-blade with side flanges, said blade being substantially wedge-shaped in plan, a garden hose coupling, a nipple carried by said coupling, a hand-grip into which said shank is telescopically fitted, said hand-grip extending beyond the intake end of the shank and having an apertured portion, and the nipple being provided with a retaining nut and cooperably fastened on said end portion.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view primarily in side elevation but with a portion broken away and shown in section, of a fountain-type scraper and cleaner embodying the improved combination of elements;

FIG. 2 is a bottom plan view of the same;
FIG. 3 is a cross-section on the line 3—3 of FIG. 1, looking in the direction of the arrows; and
FIG. 4 is a cross-section on the line 4—4 of FIG. 1.

The combination is characterized by coacting components or parts; namely, the scraper blade unit 6, the handling unit or means 8, and coupling means 10 for a conventional garden hose (not shown). The scraper unit in experimental models has been made from non-corrodable steel but may perhaps be made from aluminum or other equivalent sheet material and even commercial plastics of requisite grade. In any event, this unit 6 comprises a head and a shank. The shank is tubular as at 12 and the bore thereof, which is open-ended, provides passage for water supplied from the garden hose. The intake end is denoted at 14 and the discharge end at 16. This discharge end merges into and joins with the flat-faced scraper blade 16. This blade is approximately wedge-shaped in plan and the leading scraping edge is straight across as at 18. The lengthwise edges which converge to the tubular shank are provided with opposed longitudinal flanges 20. These flanges diverge outwardly in respect to the transverse dimension of the blade, they converge toward the discharge end of the shank at 14 and the leading ends not only are decreased in cross-section but diverge outwardly and forwardly and terminate at 22 short of the leading or scraping edge 18. With this construction the issuing jet of water (not shown) is spread or fanned out and in this manner is fanned sufficiently that an effective flush away action is attained. In other words, by sending water through the bore in the shank and spreading it out and wetting the accumulated mass of grass (not shown), the grass is softened and by pushing the scraper around the interior surface of the annular skirt portion of the lawn mower housing, a satisfactory job easily attained can be done. Continuing now with the other component parts, the handling means 8 is more specifically a rubber hand-grip. Here again, this hand-grip is of tubular construction. It may be provided with appropriate anti-slipping ribs 24 and finger-grips 25. This hand-grip is of the type disclosed in the Hunt Patent 2,666,340 and it is used here because it can be readily applied to the tubular shank 12 and once in place it will stay put. The shank and hand-grip are proportional and are, of course, of requisite cross-section so that they can be fitted telescopically together. Moreover, the shank is shorter than the hand-grip so that the intake end portion of the hand-grip is spaced from the centrally apertured end wall 26 of the hand-grip. This extension provides a flexible joint between the rigid shank 12 and the hose coupling means 10. This coupling means comprises a conventional coupling collar 28 having knurled surface portions 30, being internally screw-threaded at 32 and having a packing washer 34. The washer-equipped end of the collar is swivelly mounted in the channel of the bead 36 of a fitting. The fitting also has another bead 38 which forms a part of the channel and also provides a stop or an abutment to engage the end wall 26 as shown in FIG. 1. These beads are at one end of a nipple 40, the nipple extending through the opening in the wall and into the hand-grip and, if desired, into the end portion 14 of the shank. A friction-held push-nut or collar 42 is fitted on the nipple and punched in place as shown in FIG. 4 whereby to thus assemble and clamp the garden hose coupling in a practical and an efficient manner.

It is reiterated that the scraping blade is not only a push-along scraper but constitutes a spreader head for the flow of water issuing from the discharge end 14 of the shank in an obvious manner. The shank provides a part of the handle means which is rendered more efficient by the addition thereto of the elastic or rubber hand-grip 8. The end portion 26 provides an excellent mounting for the nipple 40 carrying the coupling 28. It follows that these component parts 6, 8 and 10 conjointly and unitedly combine to provide a satisfactory scraping flush-type lawn mower housing clearing and cleaning implement.

In practice, the lawn mower housing (say a rotary power mower either electrical or not) is turned over to expose the skirt and the accumulated grass. Then the scraper is employed as any scraping tool would be for purposes of dislodging the mass of grass and flushing it away with the water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A hand scraping and flushing device comprising an elongated rigid tube forming a water passage of substantially constant cross-sectional area, one end of said tube having a blade extending longitudinally therefrom in oblique intersecting relation to the longitudinal axis of the tube for deflecting water impinged thereon from the tube, said blade terminating in a straight outer end edge disposed laterally outwardly of the tube and including outwardly diverging side edges, said blade being of unitary construction with said tube with the tube being free of obstructions throughout its length whereby water may pass through the tube and impinge upon the plate without engaging any obstructions, a hand-grip of resilient material telescoped over the tube and substantially completely enclosing said tube, said tube extending over a major portion of the length of the hand-grip for reinforcing and rigidifying the hand-grip, said hand-grip including a resilient transverse end wall spaced from and adjacent to the end of the tube disposed interiorly of the hand-grip, said end wall having a centrally disposed aperture therein, a threaded coupling member for connection with a water hose, said coupling member including a nipple extending through the aperture in the end wall and terminating within the inner end of the tube, said nipple having a cross-sectional area considerably less than the interior of the tube for directing a stream of water through the tube onto said blade, and means on the nipple for retaining the coupling member and nipple mounted on the end wall, said coupling member being rotatably connected to said nipple for enabling swivelling of the hand-grip and blade, the external surface of the hand-grip having uneven surface areas facilitating the gripping thereof, said blade being provided with edge flanges forming continuations of the tube and decreasing in depth towards the outer end of the blade, said flanges terminating inwardly of the outer end of the blade thereby providing straight unobstructed side portions on the blade for facilitating a scraping action and enabling passage of water over the side portions, said means on the nipple including a friction type pushnut engaging the end wall intermediate the periphery of the nipple and the periphery of the end wall thereby providing a flexible connection between the hand-grip and the coupling member.

References Cited in the file of this patent

UNITED STATES PATENTS

| | | |
|---|---|---|
| 238,295 | Killam | March 1, 1881 |
| 1,142,911 | Riddiford | June 15, 1915 |
| 1,228,658 | Gaines | June 5, 1917 |
| 1,598,811 | Ferrin | Sept. 7, 1926 |
| 2,289,889 | Stick et al. | July 14, 1942 |
| 2,430,921 | Edelmann | Nov. 18, 1947 |